(12) United States Patent
Bender et al.

(10) Patent No.: US 8,051,735 B2
(45) Date of Patent: Nov. 8, 2011

(54) AUTOMATED SHIFT TRANSMISSION

(75) Inventors: Helmut Bender, Pleidelsheim (DE); Carsten Gitt, Stuttgart (DE); Detlef Schnitzer, Denkendorf (DE)

(73) Assignee: Daimler AG, Stuttgart (DE)

( * ) Notice: Subject to any disclaimer, the term of this patent is extended or adjusted under 35 U.S.C. 154(b) by 814 days.

(21) Appl. No.: 12/152,865

(22) Filed: May 16, 2008

(65) Prior Publication Data

US 2009/0193919 A1    Aug. 6, 2009

(51) Int. Cl.
  *F16H 29/00*    (2006.01)
  *F16H 3/08*    (2006.01)
(52) U.S. Cl. .......................................... 74/335; 74/329
(58) Field of Classification Search ............... 74/329, 74/331, 335, 339, 471 XY
  See application file for complete search history.

(56) References Cited

U.S. PATENT DOCUMENTS

| | | | |
|---|---|---|---|
| 5,642,643 A * | 7/1997 | Reynolds et al. ............... | 74/331 |
| 6,250,172 B1 * | 6/2001 | Pigozzi et al. .............. | 74/336 R |
| 6,845,682 B1 * | 1/2005 | Bulgrien .......................... | 74/331 |
| 6,871,131 B2 * | 3/2005 | Brandt et al. .................... | 701/51 |
| 7,077,024 B2 * | 7/2006 | Lauri et al. ...................... | 74/325 |
| 7,140,267 B2 * | 11/2006 | Haka ................................ | 74/331 |
| 7,275,455 B2 * | 10/2007 | Kennedy ......................... | 74/335 |
| 7,470,206 B2 * | 12/2008 | Rodgers, II ................... | 475/218 |
| 2004/0107786 A1 * | 6/2004 | Mawson et al. ................. | 74/329 |
| 2004/0154419 A1 * | 8/2004 | Harries et al. .................. | 74/335 |
| 2006/0207365 A1 * | 9/2006 | Baldwin ......................... | 74/340 |
| 2007/0107542 A1 * | 5/2007 | Gumpoltsberger ............. | 74/331 |
| 2007/0131046 A1 * | 6/2007 | Borgerson ...................... | 74/331 |
| 2008/0245167 A1 * | 10/2008 | Gitt ................................ | 74/331 |

FOREIGN PATENT DOCUMENTS

EP    0635389 A1 *    1/1995

* cited by examiner

*Primary Examiner* — Roger Pang
(74) *Attorney, Agent, or Firm* — Klaus J. Bach

(57) ABSTRACT

In an automated split path transmission with at least six forward speeds and three characteristic transmission steps ($s_I$, $s_{II}$, $s_{III}$), which decrease with the height of the forward speed, one of the forward speeds is a direct gear and the power of a further forward speed passing through two constant gearsets of the split path group.

10 Claims, 4 Drawing Sheets

| speed | G1 | G2 | G3 | G4 | G5 | G6 | G7 | G8 |
|---|---|---|---|---|---|---|---|---|
| ratio | 8,04 | 5,19 | 3,39 | 2,19 | 1,55 | 1,25 | 1,00 | 0,81 |
| step | | 1,55 | 1,53 | 1,55 | 1,41 | 1,24 | 1,25 | 1,24 |

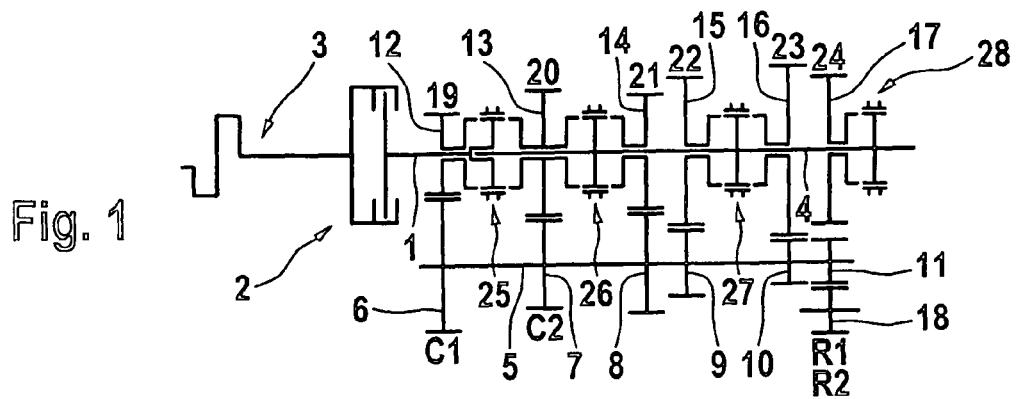
Fig. 1
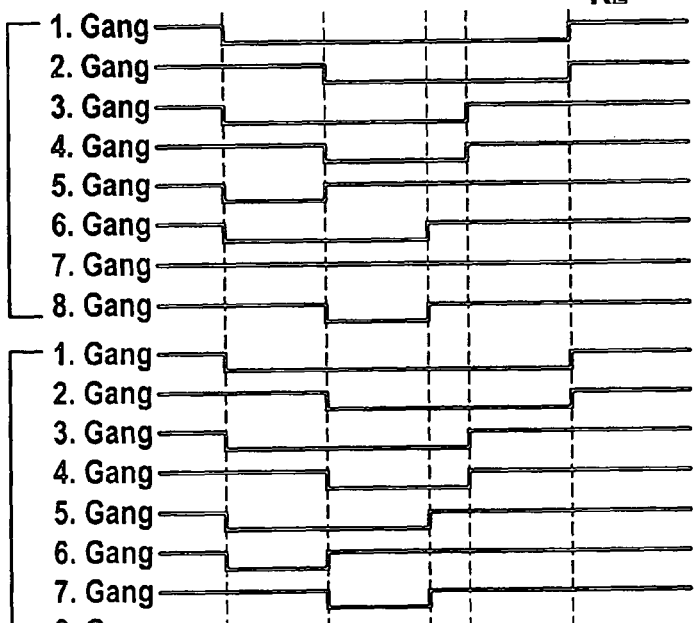
Fig. 2
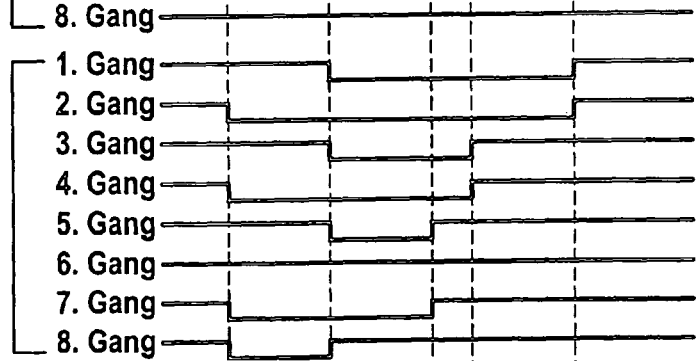
Fig. 3
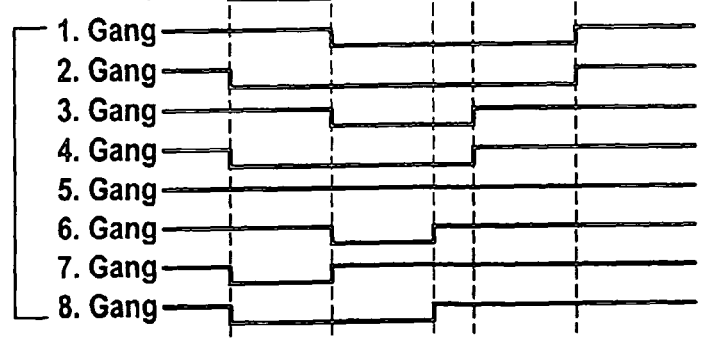
Fig. 4
Fig. 5

Fig. 6
| speed | G1 | G2 | G3 | G4 | G5 | G6 | G7 | G8 |
|---|---|---|---|---|---|---|---|---|
| ratio | 8,04 | 5,19 | 3,39 | 2,19 | 1,55 | 1,25 | 1,00 | 0,81 |
| step | | 1,55 | 1,53 | 1,55 | 1,41 | 1,24 | 1,25 | 1,24 |
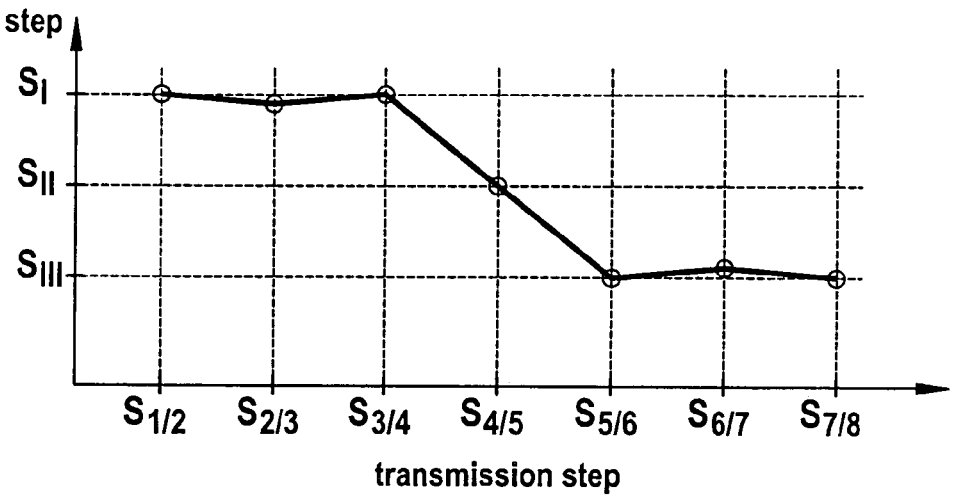
Fig. 7
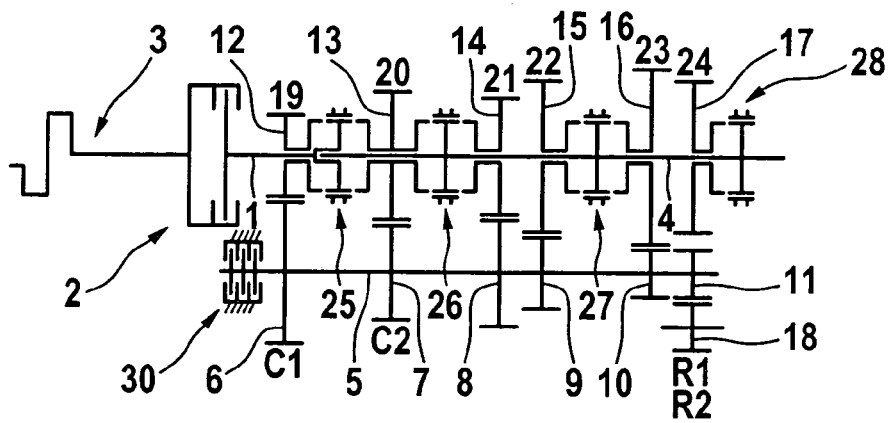
Fig. 8
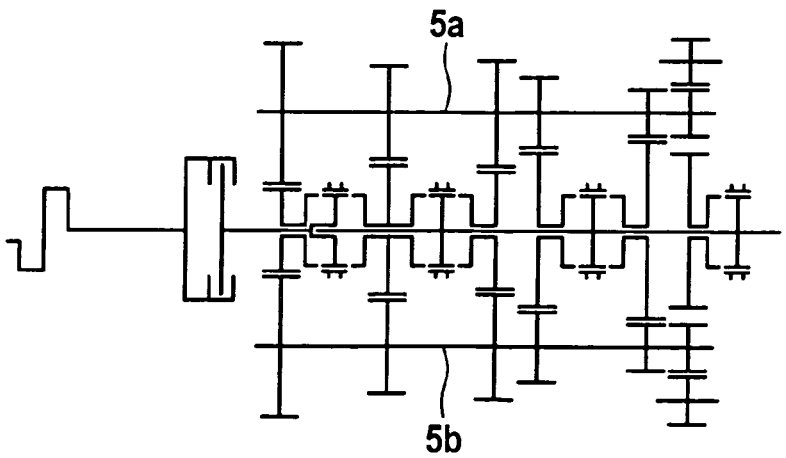
Fig. 10

AUTOMATED SHIFT TRANSMISSION

BACKGROUND OF THE INVENTION

The invention relates to an automated shift transmission for a commercial motor vehicle.

From the DE 42 26 576 C2 a car transmission is well-known, which is implemented as a split path transmission and features transmission steps between two adjacent speeds that are unequal in size.

From EP 0 557 707 B1 a method of shifting a gear-shift transmission is known. This gear-shift transmission is used in a motor vehicle and has two pairs of constant gears and a main, that is, direct transmission path. The transmission is equipped with a plurality of pairs of gearwheels, with a plurality of forward gears shiftable by synchronizer clutches or couplings and comprising gear transmission steps. The transmission also includes a reverse gear. All the gears are shifted only by simultaneous engagement of two clutches associated therewith. Two respective pairs of gearwheels are used for shifting from the first gear to the fifth gear. Pairs of gearwheels of the main transmission are used doubled for shifting two gears in one respective range-change gear shifting. A first pair of gearwheels of the main transmission is connected to a respective further pair of gearwheels in a first range-change gear shift structure for shifting two adjacent gears. A second pair of gearwheels of the main transmission is connected to a respective further pair of gearwheels in a second range-change gear shift structure for shifting two non-adjacent gears. This results in progressive transmission steps.

It is the object of the present invention to create an axially short transmission for commercial vehicles, which nevertheless has a relatively high number of speeds and a large transmission ratio spread.

SUMMARY OF THE INVENTION

In an automated split path transmission with
at least six forward speeds and three characteristic transmission steps ($s_I$, $s_{II}$, $s_{III}$), which decrease with the height of the forward speed,
one of the forward speeds is a direct gear
the power of a further forward speed passing through two constant gearsets of the split path group.

An advantage of the commercial motor vehicle transmission according to invention is that it is implemented as split path transmission. Such a split path transmission comprises at least two constant ratio gearsets and a main transmission with several gearsets. Thus the number of the constant gearsets can be multiplied by the number of said gearsets in the main transmission path, so that a relatively high number of speeds is obtained. In order to increase the number of forward speeds further without extending the axial length, a forward speed is implemented as direct gear. For the same reason the power of a further forward speed flows through two constant gearsets. Due to this embodiment, with a relatively small axial transmission length, at least six—and, in particular, eight or even ten—forward speeds can be provided.

Due to the constant transmission step between the two constant gearsets two adjacent speeds of the vehicle transmission show the same transmission stepping, if there is no further gear arranged in between those adjacent speeds. This is also called geometrical transmission stepping. Opposite to this geometrical transmission stepping is the progressive transmission stepping. In the case of this progressive transmission stepping the transmission step between two adjacent forward speed is the larger, the lower the speeds is. Thus for instance the transmission step between first and the second forward speed is larger than between the third and fourth forward speed. With such a progressive stepping it can be achieved that the differences between the maximal achievable vehicle speeds in the individual forward speeds, are almost equal.

According to invention the splitter transmission features geometrically stepped forward speeds, which result from one main transmission and the mentioned change in the splitter group. Furthermore this transmission shows additional forward speeds, which are
a) the direct gear and
b) the forward speed with a power flow through both constant gearsets.

According to invention these two additional forward speeds are arranged in such a way between the geometrical transmission steps of the higher forward speeds that between the higher forward speed a quasi-progressive transmission steps results. The exact arrangement of the additional forward speeds a) and b) in the diagram of the splitter transmission results from the intended application of the commercial motor vehicle. For example demands on construction-site trucks differ from the demands on on-Highway-vehicles. From these different demands and the resulting different arrangements of the two additional forward speeds a) and b) an irregular shifting pattern results. This shifting pattern especially differs from the H-shifting pattern known from usual manual transmissions with a countershaft. The splitter transmission according to invention is however automated, so that the driver is not burdened with this irregular shifting pattern. Instead he can get a regular shifting pattern at the shift lever for example by a shift-by-wire system. In such a shift-by-wire-system an electronic unit changes the shift lever position into shift actuations in the transmission. Alternatively or additionally there can be a shift lever with a sequential shifting pattern, which is moved into the one direction for shifting up and into the other direction for shifting down. Alternatively or additionally a fully automatic drive mode can be presented to the driver, which shifts each speed dependent on the load requirement and the vehicle speed. Such fully automatic drive modes are known from planetary automatic transmissions for passenger cars.

The automated means for actuating clutch rings to shift the speed can be a gear-selector drum. Food-actuated gear-selector drums are known from motorcycles. An automated gear-selector drum as can be used in combination with the invention is described in EP 0 557 707 B1.

The automated circuit can also been realized by means of an XY-actuator. Such an XY-actuator operates a selector shaft, which is tiltable and longitudinally displaceable in the transmission case. The selector shaft is connected with a shifting finger, which meshes in recesses of gearshift rods. Each gearshift rod is connected with a shift fork or a shift swinging fork. Each of these shift forks or shift swinging forks is coupled with a shift sleeve of a clutch ring. Thus the shift finger can select freely between the clutch rings and operate one of it. The longitudinal displacement of the shift finger can select one clutch ring whereas the tilting of the shift finger engages or disengages the clutch ring. On the other hand the turning of the shift finger can select one clutch ring whereas the longitudinal displacement of the shift finger engages or disengages the clutch ring. Thus the principle of freely selecting the gearset—respectively the speed—allows a high number of at least six or eight forward speeds to be up- and downshifted skipping sequentially following gears. This keeps shifting time short, which is helpful for commercial motor vehicle transmissions. Thus speeds can be skipped with an XY-actuator without additional mechanical construction. For example during an emergency braking it can be helpful to shift down fast by skipping one or more speeds.

With the transmission according to invention the smallest necessary transmission step can depend on the necessary driving characteristics in the upper speeds, without the transmission step between the two constant gearsets being small. Due to the choice of three different characteristic transmission steps, which decrease with the height of the forward speeds, the transmission according to invention can exhibit a large total transmission spreading despite small transmission steps in the higher speeds.

In a preferred embodiment sequentially following forward speeds of a first group of low speeds show approximately equal transmission steps $s_I$ to each other. These transmission steps $s_I$ are relatively large. Sequentially following forward speeds of a second group of high speeds show approximately equal transmission steps $s_{III}$ to each other. These transmission steps $s_{III}$ are relatively small. In between both transmission steps $s_I$ and $s_{III}$ the following mathematical relationship can be found:

$$s_I = s_{III}^2 \qquad \text{Equation 1}$$

The embodiment of the transmission that is equipped with eight forward speeds is the best mode. However, also, embodiments with another number of speeds are possible. In particular six or ten forward speeds can be arranged. For the three transmission steps $S_{1/2}$, $S_{2/3}$, $S_{3/4}$ between first four forward speeds according to above mentioned principle the following equation can be applied:

$$s_{1/2} \approx s_{2/3} \approx s_{3/4} \approx s_I \qquad \text{Equation 2}$$

According to the principle described above for the transmission steps $S_{5/6}$, $S_{6/7}$, $S_{7/8}$ of the last three forward speeds of such a transmission the following equation can be applied:

$$s_{5/6} \approx s_{6/7} \approx s_{7/8} \approx s_{III} \qquad \text{Equation 3}$$

The ratio of the highest forward gear of the first group of low speeds and the ratio of the lowest forward gear of the second group of high speeds are dimensioned in a size that the transmission step $S_{II}$ lying between them lies between the two other characteristic transmission steps:

$$s_I > s_{II} > s_{III} \qquad \text{Equation 4}$$

A particularly well drivable transmission is thus received.

In addition, the transmission step $S_{II}$ can be selected in such a way that it is either just as large as the larger or the smaller of the two characteristic transmission steps:

$$s_I \approx s_{II} > s_{III} \qquad \text{Alternative a.)}$$

$$s_I > s_{II} \approx s_{III} \qquad \text{Alternative b.)}$$

Alternative a.) achieves a relatively roughly stepped transmission with a relatively large total spreading. However by alternative b.) a relatively finely stepped transmission with a somewhat smaller total spreading is achieved.

With the dimensioning in accordance with equation 4, a very good compromise between the two border dimensions alternative a.) and/or alternative b.) is achieved. In most applications this compromise leads to a good drivability despite of a sufficient total spreading. A particularly favorable gradation of the speeds results, if according to equation 4 $S_{II}$ fulfils equation 5:

$$s_{II} \approx s_{III}^{(3/2)}$$

In this case a transmission step is achieved, that is similar to the ideal-progressive transmission step.

The countershaft transmission can be realized with dog clutches. In a preferred embodiment the frontmost clutch ring is equipped with synchronizers, whereas all following clutch rings are purely dog clutches. In this case the frontmost clutch ring is the one engaging and disengaging the splitter group respectively the two constant gearsets.

Further advantages of the invention will become apparent from the following description of several alternative embodiments on the basis of the accompanying drawings.

BRIEF DESCRIPTION OF THE DRAWINGS

FIG. 1 shows schematically an automated commercial motor vehicle shift transmission with eight forward speeds, FIG. 2 shows an arrangement of the split path transmission in accordance with FIG. 1, in which the direct gear forms the second highest gear, FIG. 3 shows a dimensioning of the split transmission in accordance with FIG. 1, in which the direct gear forms the highest gear, FIG. 4 shows a dimensioning of the split path transmission in accordance with FIG. 1, in which the direct gear forms the third-highest gear, FIG. 5 shows a dimensioning of the split transmission in accordance with FIG. 1, in which the direct gear forms speed for the fifth forward, FIG. 6 shows a table the transmission steps for split path transmissions in accordance with FIG. 1 with a dimensioning in accordance with FIG. 2, FIG. 7 shows correspondingly to FIG. 6, in a diagram the size of each transmission step over its respective "order", FIG. 8 shows the split path transmission in accordance with FIG. 1 extended by a countershaft brake.

DESCRIPTION OF PARTICULAR EMBODIMENTS

Figure 9:
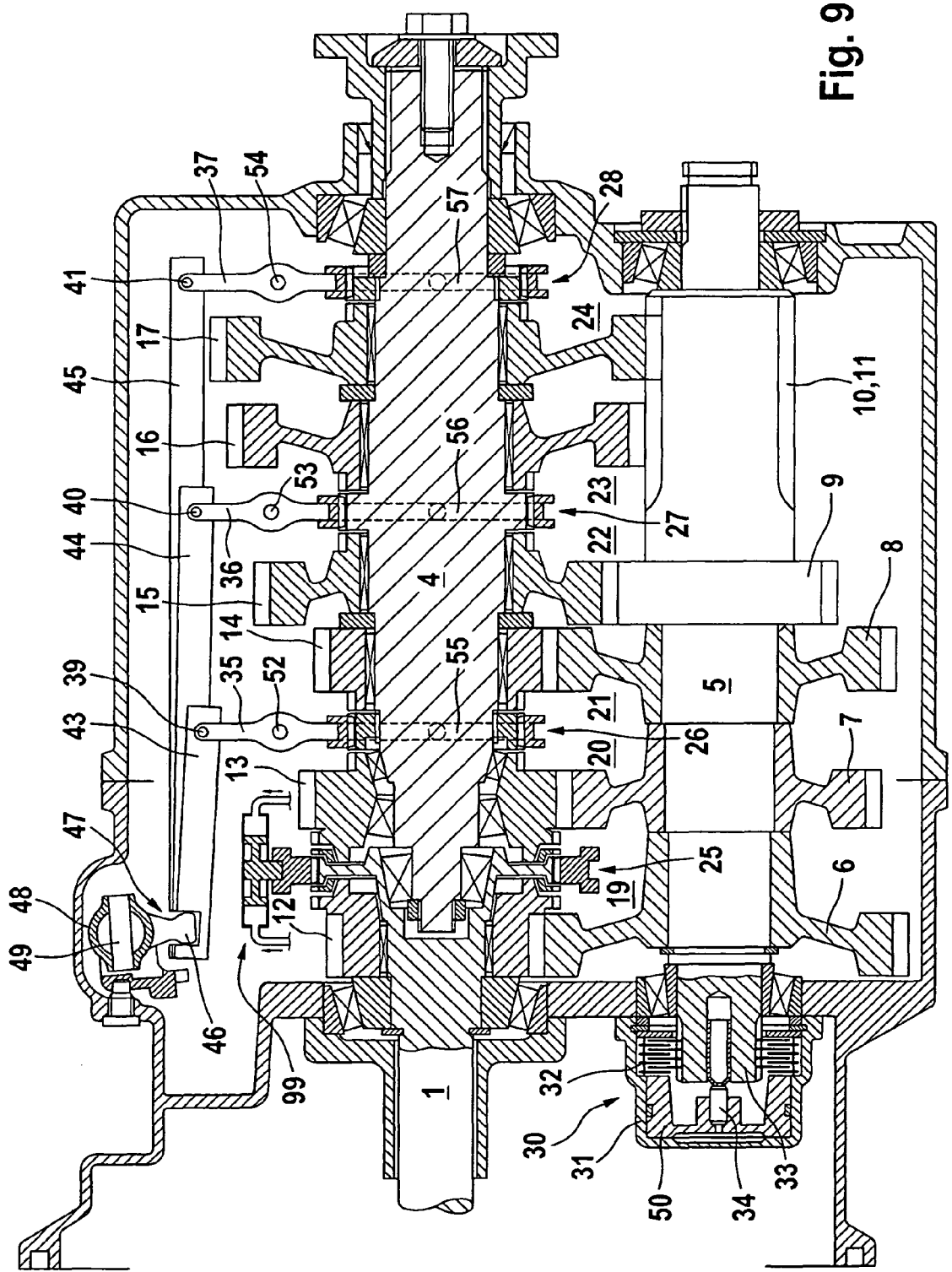
FIG. 9 shows in a detailed sectional plane a split path transmission similar to the one shown in FIG. 8, with the only difference that the reverse gear is placed differently, FIG. 10 the split path transmission similar to FIG. 1, but extended by a second countershaft

FIG. 1 schematically shows a countershaft transmission for a powertrain of a commercial motor vehicle with the engine located in longitudinal direction. A transmission input shaft 1 of the countershaft transmission is connected by means of a dry starting clutch 2 and/or shift clutch with a combustion engine 3. At the rear end of the transmission input shaft 1 a main shaft 4 is provided which, with its front end, is mounted in alignment with the input shaft 1 by a roller bearing. Parallel to, and spaced from, the transmission input shaft 1 and the main shaft 4 a countershaft 5 is arranged. This countershaft 5 carries six fixed gears 6 to 11. With one exception their diameter decreases from the front to the rear. The frontmost fixed gear 6 meshes with an idler gear 12, which is located coaxially and rotatably on the transmission input shaft 1. Each of the following four fixed gears 7, 8, 9, 10 meshes with an idler gear 13, 14, 15, 16 that is arranged coaxially and rotatable on the main shaft 4. The rear fixed gear 11 meshes with a separate intermediate gear 18, which meshes with an idler gear 17, which is located coaxially and rotatably on the main shaft 4. The intermediate gear 18 is arranged spatially. Only to the better representation this intermediate gear 18 is shown pivoted into the plane of the drawing but is in engagement with the gear 24. Thus six planes of gearsets 19, 20, 21, 22, 23, 24 are provided. The first two planes of gearsets 19, 20 form constant gearsets C1 and C2. The remaining planes of gearsets 21, 22, 23, 24 are associated with the main transmission and cover the plane of gearset 24 of the reverse gears R1 and R2.

Between the planes of gearsets 19, 20 of the two constant gearsets C1 and C2 a first clutch ring 25 is concentrically arranged on the transmission input shaft 1. This clutch ring 25 is arranged close to the roller bearing of the main shaft 4 in the transmission input shaft 1. This clutch ring 25 features a front position, a central neutral position and a rear position. In FIG. 1 the central neutral position is shown, in which the clutch ring 25 does not engage either one of the idler gears 12, 13. In the front position the first clutch ring 25 couples the transmission input shaft 1 positively to the idler gear 12 of the first constant gearset C1. In the rear position the first clutch ring 25 couples the transmission input shaft 1 positively to the idler gear 13 of the second constant gearset C2.

Between the plane of gearset 20 of the first constant gearset C1 and the third plane of gearset 21 concentrically on the main shaft 4 the second clutch ring 26 is arranged. This clutch ring 26 features a front position, a central neutral position and a rear position. In FIG. 1 the central neutral position is represented, in which the clutch ring 26 does not engage either of the idler gears 13, 14. In the front position the first clutch ring 26 positively couples the main shaft 4 and the idler gear 13 of the second constant gearset C2. In the rear position the first clutch ring 26 positively couples the main shaft 4 and the idler gear 14 of the third plane of gearset 21.

Between the fourth plane of gearset 22 and the fifth plane of gearset 23 concentrically a third clutch ring 27 is arranged on the main shaft 4. This clutch ring 27 features a front position, a central neutral position and a rear position. In FIG. 1 the central neutral position is represented, in which the clutch ring 27 does positively engage either of the idler gears 15, 16. In the front position the third clutch ring 27 positively couples the main shaft 4 and the idler gear 15 of the fourth plane of gearset 22. In the rear position the first clutch ring 27 positively couples the main shaft 4 and the idler gear 16 of the fifth plane of gearset 23.

Behind the sixth plane of gearset 24 concentrically a third clutch ring 28 is arranged on the main shaft 4. This clutch ring 28 features a front position and a central neutral position. In FIG. 1 the central neutral position is represented. In the front position the third clutch ring 27 positively couples the main shaft 4 to the idler gear 17 of the plane of gearset 24 of the two reverse gears R1 and R2.

When changing the gear in the countershaft transmission in accordance with FIG. 1 a shifting procedure in accordance to DE 102 49 952 A1 can be used. In this procedure the starting and shift clutch 2 remains closed during most of the gear changes.

FIG. 2 shows a first set up for the split path transmission in accordance with FIG. 1. Here the direct gear forms speed G7 for the second highest forward gear.

In the first two forward speeds G1 and G2 the third clutch ring 27 engages to the gear 23. The frontmost clutch ring 25 is only changed from the front position to the rear position, so that a transmission step $S_{1/2}=1.55$ is obtained by a switch from the transmission ratio of the first plane of gearset 19 to the transmission ratio of the second plane of gearset 20. This transmission step is also evident in the table FIG. 6 and the diagram FIG. 7.

For the sequentially following third forward speed G3 there is a change to the first constant gearset C1 and the fourth plane of gearset 22 by means of the clutch rings 25, 27.

For the sequentially following change to the fourth forward speed G4 the frontmost clutch ring 25 is shifted from the front to the rear. From the transmission ratio of the first plane of the gearset 19 in relation to the transmission ratio of the second plane of the gearset 20 a transmission step $S_{3/4}=1.55$ results. Thus this transmission step has the same size as the first transmission step. This transmission step is also evident in the table FIG. 6 and the diagram FIG. 7. The transmission step $S_{2/3}=1.53$ between the first transmission step $S_{1/2}$ and the third transmission step $S_{3/4}$ results from the total transmission ratio of the second forward gear in relation to the third forward speed. Thus the first three transmission steps $S_{1/2}$, $S_{2/3}$, $S_{3/4}$ are almost equal and form a quasi ideal-geometrical transmission stepping.

Sequentially the fifth forward speed G5 follows. The power of this fifth forward speed G5 flows through the two planes of gearsets 19, 20 of the constant gearsets C1 and C2. This power flow diverges from the scheme of the two transmission steps $S_{1/2}$ and $S_{3/4}$. Thus a smaller transmission step $S_{4/5}$ results, as can be seen in FIGS. 6 and 7.

For the next sequentially following shift to the sixth forward speed G6 it is only necessary to shift the second clutch ring 26 from the front to the rear. Thus the power in the countershaft transmission flows from the constant C1 through the third plane of gearset 21. The transmission step $S_{5/6}=1.24$ results from the total speed ratio of the fifth forward gear G5 in relation to the sixth forward speed G6. Thus the transmission step $S_{5/6}$ is still smaller than the preceding transmission step $S_{4/5}$, which is already small.

In the forward speed G8—i.e. two speeds after that—the same plane of gearset 21 in the main transmission is combined with the constant gearset C2. Thus the size of the transmission step $S_{6/8}$ between the sixth forward speed G6 and the forward speed G8 is equal to the size of the transmission step $S_{1/2}$ and/or $S_{3/4}$.

However in between the sixth forward speed G6 and the eighth forward speed G8 the seventh forward speed G7 is located. This seventh forward speed G7 is realized as direct gear. To engage this direct gear the first clutch ring 25 is moved to the rear and the second clutch ring 26 is moved forward, so that the idler gear 20 creates a positive coupling between the transmission input shaft 1 and the main shaft 4. Thus the aforementioned transmission step $S_{6/8}$ is divided into two equal large transmission steps $S_{6/7}=1.25$ and $S_{7/8}=1.24$. In FIG. 6 and FIG. 7 it is evident that the last three transmission steps $S_{5/6}$, $S_{6/7}$, $S_{7/8}$ show almost same size.

FIG. 3 shows a further dimensioning of the split path transmission in accordance with FIG. 1. Here the direct gear is the highest gear G8.

The first four forward speeds G1 to G4 are identical to the first dimensioning according to FIG. 2.

Concerning the scheme of power flow the fifth and the seventh forward speed G5 and G7 are realized by the change of the constant gearset C1 respectively C2, while the plane of gearset 21 in the main transmission stays the same. Thus both power flows differ in the constant gearset C1 respectively C2.

Between these two forward speeds G5 and G7 the sixth forward speed G6 is located. The power of this sixth forward speed G6 flows through the constants gearsets C1 and C2.

The forward speed G8 is realized by the direct gear.

FIG. 4 shows a third dimensioning of the split path transmission accordance with FIG. 1. Here the direct gear is the third-highest gear G6. The power of forward speed G8 flows through the two constants gearsets of c1 and C2. The first and the second forward speed G1 and G2 mate with the same plane of gearset 23 in the main transmission.

The third and the fourth forward speed G3 and G4 mate with the same plane of gearset 22 in the main transmission. The fifth and the seventh forward speed G5 and G7 mate with the same plane of gearset 21 in the main transmission.

FIG. 5 shows a fourth dimensioning of the split path transmission in accordance with FIG. 1. Here the direct gear is the fifth forward speed G5. The power of the seventh forward speed G7 flows over the two constants gearsets C1 and C2. The first and the second forward speed G1 and G2 mate with the same plane of gearset 23 in the main transmission. The third and the fourth forward speed G3 and G4 mate with the same plane of gearset 22 in the main transmission. The sixth and the eighth forward speed G6 and G8 mate with the same plane of gearset 21 in the main transmission.

In FIG. 8 a splitter transmission in accordance with FIG. 1 is shown, that is extended by a countershaft brake 30.

In FIG. 9 a detailed sectional plane of a split path transmission similar to FIG. 8 is shown. The only difference is that the reverse gear is placed in front of the fifth plane of gearset 23.

The countershaft brake 30 features a multiple-plate brake 32. This multiple-plate brake 32 is arranged in a brake housing 31. This brake housing 31 is arranged on the front end of the countershaft 4 and flanged to the transmission housing. By this construction the countershaft brake 30 can be realized as an alternative feature of the countershaft transmission. The inner lamellas of the multiple-plate brake 32 are connected to a pin-shaped front end 33 of the countershaft 4. This pin-shaped end 33 has a centric blind hole, into which a tin part is inserted, that contacts a pin 34 inserted in a blind hole of a piston 50. The lamellas of the multiple-plate brake 32 can be coupled frictional by a piston 50.

Figure 11:
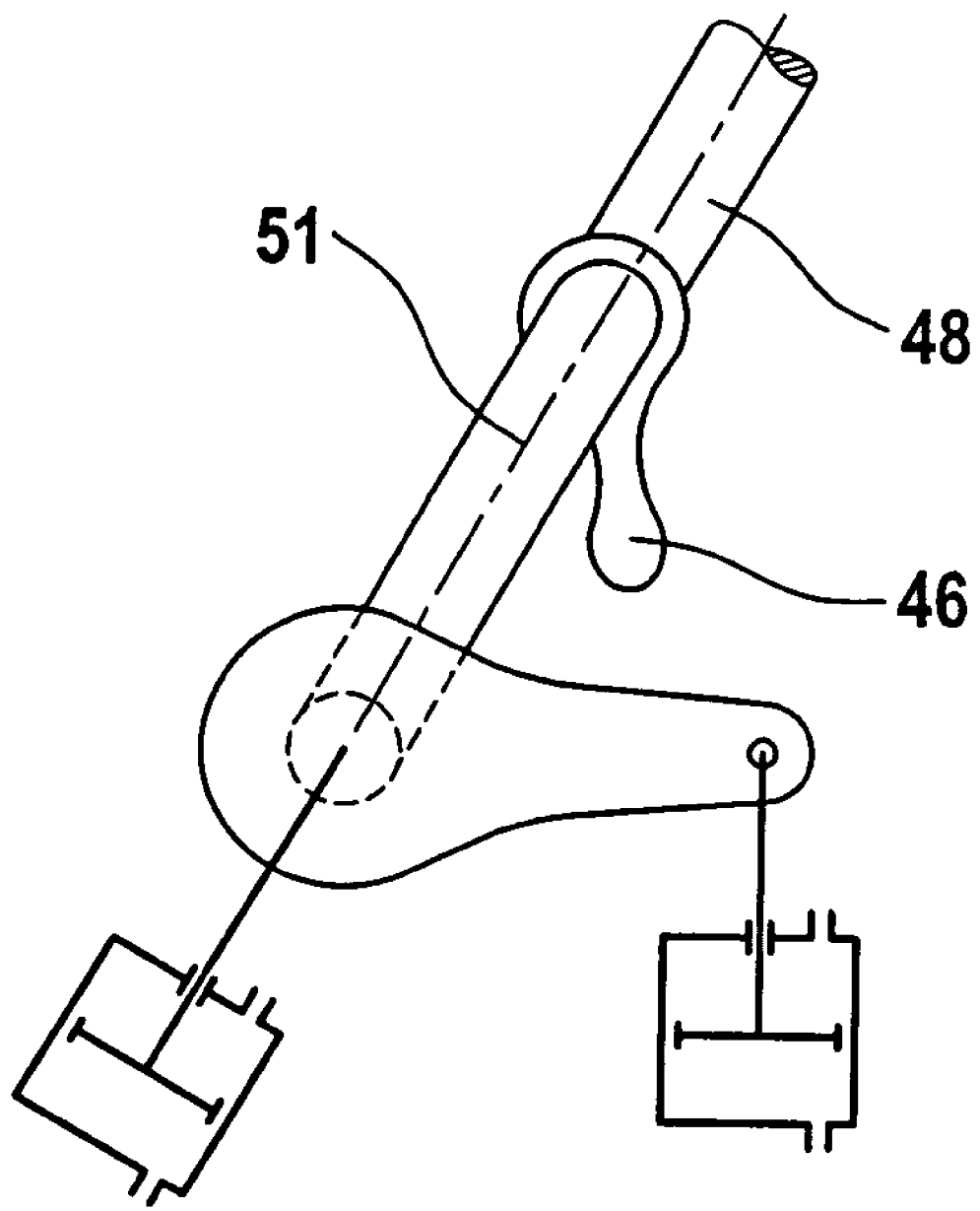
FIG. 11 shows schematically a selector shaft actuated by a XY-actuator.

Second to fourth clutch ring 26, 27, 28 is operated by one of three shift forks 35, 36, 37. The swiveling axes 52, 53, 54 of those shift forks 35, 36, 37 are arranged above the main shaft 4. Each of those shift forks 35, 36, 37 is connected by means of a further, bearing 39, 40, 41 with a gearshift rod 43, 44, 45. Each of those gearshift rods 43, 44, 45 features a recess 47, in which a shift finger 46 can mesh. These three recesses 47 form a shift groove. The shift finger 46 is fixedly connected to a hollow selector shaft 48 by means of a pin 49. The selector shaft 48 is aligned perpendicular to the gearshift rods 43, 44, 45. If the selector shaft 48 is axially shifted, then the shift finger 46 moves within the shifting groove between the individual recesses 47 of the gearshift rods 43, 44, 45. Thus one of the shifter rods 43, 44, 45 is selected by axial displacement of the selector shaft 48. From FIG. 9 in combination with FIG. 11 it becomes evident that the shift finger 46 in the recess pushes the selected gearshift rod 43 or 44 or 45 forward or backward if the selector shaft 48 is swiveled around its longitudinal axis 51. The swiveling direction of the control shaft 48 decides whether the shifter rod is moved forwards or back. Thus the selected shift fork 35 or 36 or 37 swivels around its swiveling axis 52 or 53 or 54. At the lower end a sliding block of each shift fork 35, 36, 37 meshes in a groove of the shifting sleeve 55, 56, 57. If one of the gear-shift rods 43, 44, 45 is displaced in one direction, then the respective shifting sleeve 55 or 56 or 57 is moved in the other direction. Thus the three or two positions of the clutch rings 26, 27, 28 are attainable. The clutch ring 25, which is assigned only to the constants gearsets C1 and C2, is operated by a separate actuator 99. This actuator 99 can be shifted in three positions independent of the position of the shift finger 46.

To obtain synchronization of the idler gear 13 or 14 or 15 or 16 or 17 and the concerned main shaft 4 during the shifting process—i.e. up-shifts or down-shifts—, the countershaft 5 must be braked or accelerated during neutral position of the transmission. Neutral position of the transmission means that no fixed coupling between the transmission input shaft 1 and the main shaft 4 is present. This is obtained by all but one clutch rings 25, 26, 27, 28 being shifted into the neutral position. In another embodiment all clutch rings 25, 26, 27, 28 are shifted into the neutral position to obtain the neutral position of the countershaft transmission.

The multiple-plate brake for the deceleration of the countershaft 5 can be actuated for example pneumatically or hydraulically. Alternatively or additionally the rotational speed of the countershaft 5 can be slowed down by means of an exhaust brake of the driving motor while dry starting clutch 2 is closed.

For accelerating the countershaft 30 the rotational speed of the engine is raised while starting clutch 2 and one of the constant gearsets C1 or C2 is engaged and the other clutch rings 26, 27, 28 are in neutral position. The rotational speed of the countershaft 30 is raised for up-shifts.

Downshifts are not synchronized by countershaft brake 30. Downshifts are synchronized by the engine 3, i.e. the crankshaft. The rotational speed of the crankshaft is accelerated while the clutch 2 is closed and the old speed has already been taken out.

For this countershaft transmission with a dimensioning in accordance with FIG. 2 the table FIG. 6 shows the transmission steps mentioned above. In this dimensioning the direct gear is the seventh speed G7. Thus the last forward speed G8 is a high speed gear. In this example the lowest three transmission steps $S_I$ are at least close to $S_I=1.55$. Thus the first four forward speeds G1 to G4 represent said first group of forward speeds. The highest three transmission steps $S_{III}$ however are close to $S_{II}=1.24$. Thus the last four forward speeds G5 to G8 represent said second group $S_{III}$ of forward speeds. Between the fourth and the fifth forward speed G4 and G5 is the transmission step $S_{II}=1.41$, which is subject to the equation 5 mentioned above. The appropriate process of the transmission steps is shown graphically in FIG. 7.

FIG. 10 shows the splitter transmission in accordance with FIG. 1 extended by a further countershaft 5a. Thus the power of propulsion is distributed on the two countershafts 5a, 5b. This unloads the meshing teeth of the gearsets. For this reason the respective gears can be dimensioned less broadly than in an embodiment with only one countershaft. Alternatively or additionally the distance between the main shaft 4 and the countershafts 5a, 5b can be reduced in relation to an embodiment with only one countershaft. In an alternative embodiment the rearmost clutch ring 28 can feature three positions. Thus two gearsets can be engaged and disengaged by this clutch ring 28. This makes a ten-gear-transmission.

In the shown embodiment the neutral position of the frontmost clutch ring is not necessary for the basic function of the transmission. Thus in an alternative embodiment the clutch ring 25 does not exhibit a neutral position. I.e., in the countershaft transmission in accordance with FIG. 9 either the constant gearset C1 or the constant gearset C2 is engaged.

In an alternative embodiment the countershaft transmission has an arrangement that allows the countershaft to be decoupled when the direct gear is engaged. Such an embodiment is shown in U.S. Pat. No. 5,381,703.

The described embodiments concern only exemplary arrangements. A combination of the described features for different embodiments is likewise possible. Further embodiments, in particular features of the devices not described, but belonging to the invention, are to be taken from the geometry of the devices shown in the drawings.

What is claimed is:
1. An automated split path transmission
having at least six forward speeds, a group of sequentially following high forward speeds (G5, G6, G7, G8) with low transmission steps ($S_{III}$) of about the same size and a group of sequentially following low forward speeds (G1, G2, G3,) with high transmission steps ($S_I$), and at least one transmission speed (G4) with an intermediate transmission step ($S_{II}$) disposed between the group ($S_I$) of speeds with high transmission steps and the group ($S_{III}$) of transmission speeds with low transmission steps, the intermediate transmission step ($S_{II}$) having a value which difffers less than 2.9% from that of the low transmission steps ($S_{III}$) to the power of three half ($S_{II} \approx S_{III}^{(3/2)}$), one of the high forward speeds (G7) being a direct gear, one of the forward speeds (G5) having a power path passing through two constant gear sets (C1, C2) of a split path group, and the gears being shiftable by clutch rings (25, 26, 27, 28) with automated means for actuating the clutch rings, to perform the shifting between the speeds.

2. An automated split path transmission according to claim 1, wherein the medium transmission step ($S_{II}$) differs less than 2% from a value determined by the low transmission step ($S_{III}$) to the power of three half.

3. An automated split path transmission according to claim 2, wherein the medium transmission step ($S_{II}$) differs less than 1% from a value determined by low transmission step steps ($S_{III}$) to the power of three half.

4. An automated split path transmission according to claim 1, wherein all transmission steps ($S_{1/2}$, $S_{2/3}$, $S_{3/4}$) in said group of high transmission steps ($S_I$) differ less than 3% from each other, while all transmission steps ($S_{5/6}$, $S_{6/7}$, $S_{7/8}$) in said group of low transmission steps ($S_{III}$) also differ less than 3% from each other.

5. An automated split path transmission according to claim 1, wherein the speeds (G1 to G8) are shiftable in a non-sequential order by the automated means.

6. An automated split path transmission according to claim 5, wherein the automated means includes an XY-actuator which actuates a shift finger (46) to select and to shift the clutch rings (26 to 28).

7. An automated split path transmission according to claim 6, wherein the clutch rings (26 to 28) of a main transmission are dog clutches which are synchronizable by accelerating a crankshaft on an engine when a downshift is desired.

8. An automated splitter transmission according to claim 6, wherein the clutch rings (26 to 28) of a main transmission are dog clutches which are synchronizable by means of a brake (30) if an upshift is desired.

9. An automated split path transmission according to claim 8, wherein both constant gear sets (C1, C2) are engagable by a single clutch ring (25) in the form of a synchronizer ring actuated by an actuator (99) separate from an XY-actuator which actuates the shift finger (46) to select and to shift clutch rings (26 to 28).

10. An automated split path transmission according to claim 8, wherein said brake is a countershaft brake (30).

* * * * *